March 26, 1968      J. T. MITCHELL      3,375,428

REGULATED RECTIFIER CIRCUIT

Filed Feb. 4, 1964

INVENTOR.

BY JEFFERSON T. MITCHELL

*Willis L. Vary*

ATTORNEY

United States Patent Office 3,375,428
Patented Mar. 26, 1968

3,375,428
REGULATED RECTIFIER CIRCUIT
Jefferson T. Mitchell, Bay Village, Ohio, assignor to Lorain Products Corporation, a corporation of Ohio
Filed Feb. 4, 1964, Ser. No. 342,496
12 Claims. (Cl. 321—18)

ABSTRACT OF THE DISCLOSURE

This invention relates to a regulated power supply having a pair of controlled rectifiers each actuated by the same gate circuit controlled rectifier. The gate circuit controlled rectifier receives square wave synchronizing signals derived from an AC source and signals from a phase control oscillator responsive to the output of a difference amplifier connected to the power supply output. In response to this combination of signals, the gate circuit controlled rectifier controls the periods of conductivity of the pair of rectifiers to closely regulate the power supply output voltage.

---

It is known in the art to employ semi-conductors, such as silicon controlled rectifiers in converters and inverters. Conventional pulse firing systems for controlled rectifiers are not suitable in installations where the output of the controlled rectifiers is delivered to inductive loads, such as transformers, because current does not build up through the transformers fast enough to provide a minimum holding current through the controlled rectifiers. It is also known to employ squarewave firing systems for controlled rectifiers, however, these systems are relatively complex.

Accordingly, an object of this invention is to provide a controlled rectifier type power supply suitable for operation with highly inductive loads.

Another object of this invention is to provide a closely regulated squarewave controlled power supply having relatively few parts.

Yet another object of this invention is to provide a solid state regulator in which the output is closely regulated by controlling the input pulse width.

Still another object of this invention is to provide a voltage regulator suitable for wide changes between input alternating current voltage and output alternating current or direct current potential.

It is a still further object of this invention to provide a variable pulse width regulator employing controlled rectifiers which regulator is particularly adapted for highly inductive loads.

These and various other objects and features of the invention will be more clearly understood from a reading of the detailed description of the invention in conjunction with the drawing in which.

Figure 1:
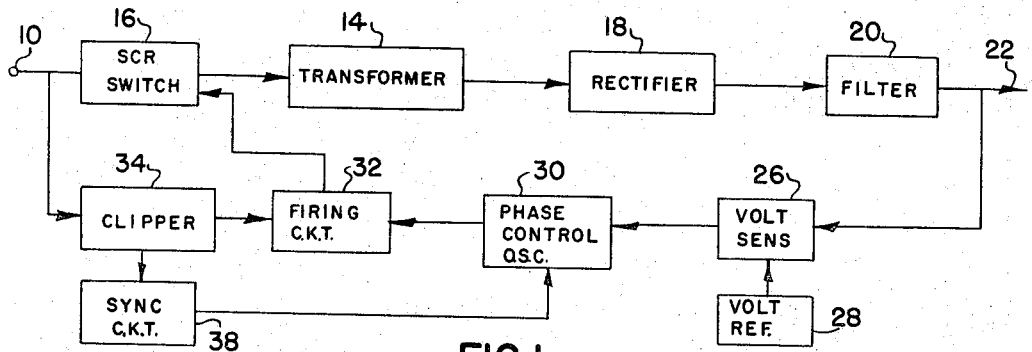
FIGURE 1 is a block diagram of one illustrative embodiment of this invention.

Referring now to FIGURE 1, there is depicted, in block diagram, one illustrative embodiment of this invention. As therein depicted, the power supply is connected to an alternating current line 10. A transformer 14 is connected to alternating current line 10 through a controlled rectifier 16. Transformer 14 is connected to a fullwave rectifier combination 18 which feeds a rectified output through a filter circuit 20 to output terminals 22. Output voltage regulation is accomplished by feeding back a portion of the output to control the width of the pulses on the primary winding of transformer 14 through a voltage sensing circuit 26 which compares the feedback voltage with a reference voltage from a voltage reference circuit 28 and delivers an error signal to a phase control oscillator 30. The output of the phase control oscillator 30 is fed to a firing circuit 32 which firing circuit controls the firing of the controlled rectifier switch 16.

It is important that the firing be synchronized with the alternating current line potential of line 10. This synchronism is obtained by connecting a clipper circuit 34 to the line 10 and delivering the clipping circuit output through a synchronizing circuit 38 to the phase control oscillator 30. A second output from the clipper circuit 34 is also fed to the firing circuit to energize the controlled rectifier switch 16.

Figure 2:
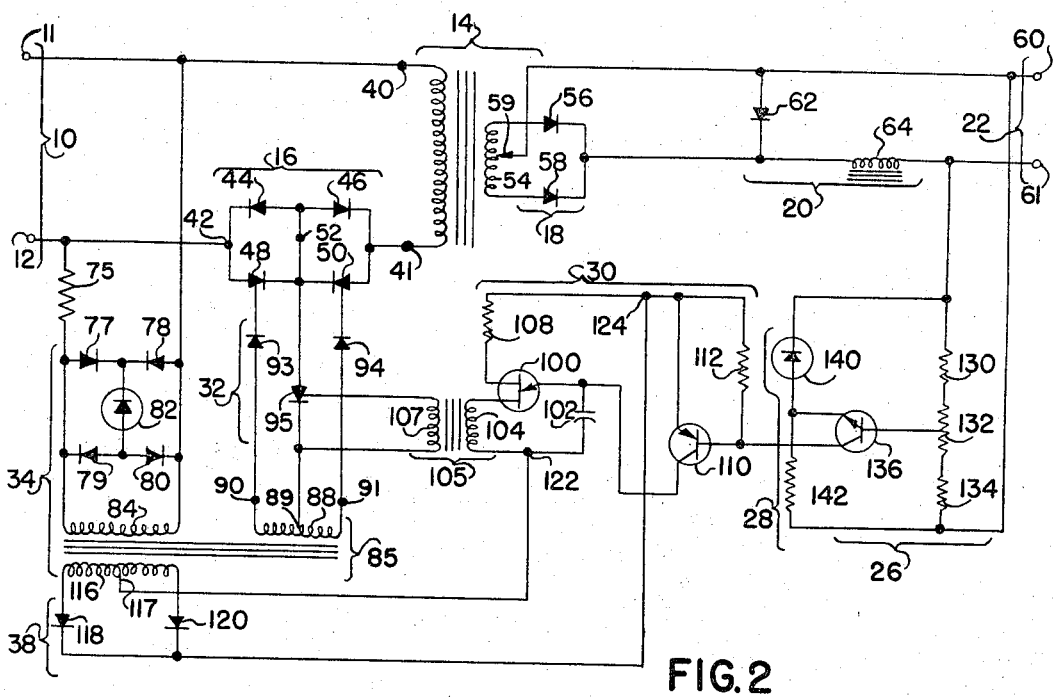
FIGURE 2 is a schematic representation of one embodiment of the block diagram system of FIGURE 1.

FIGURE 2 schematically depicts one illustrative embodiment of the invention shown in FIGURE 1. The alternating current line 10 includes a terminal 11 connected to input terminal 40 of transformer 14 and a terminal 12 connected to input terminal 42 of controlled rectifier switch 16. The switch 16 includes a pair of diodes 44, 46, which are preferably but not necessarily solid state diodes, connected in polarity opposition between terminal 12 and terminal 41 of the transformer 14 and a pair of controlled rectifier switches 48, 50 serially connected in polarity opposition and connected in parallel with diodes 44, 46. Advantageously, these rectifiers may be of the tube type. Preferably, however, these controlled rectifiers 48, 50 are silicon controlled rectifiers or equivalent solid state devices. This embodiment is particularly adapted to controlled rectifiers which require current on their gate electrodes, including silicon controlled rectifiers.

With respect to the controlled rectifier switch 16, the purpose of diodes 44, 46 is to clip the reverse voltages applied to the controlled rectifiers 48, 50. Many types of controlled rectifiers cannot be damaged by excess forward voltages but they can be damaged by excess reverse voltages. Accordingly, diodes 44, 46 are provided to remove these reverse voltages and thereby protect controlled rectifiers 48, 50. Thus, the diodes 44, 46 remove the reverse voltages entirely from controlled rectifiers 48, 50. This arrangement permits the use of relatively low voltage rating controlled rectifiers for the controlled rectifiers 48, 50 while employing relatively high voltage rating diodes 44, 46. This arrangement is an economical one in comparison to one containing only controlled rectifiers without the reverse voltage protecting diodes 44, 46.

It is common in the art to employ pulse firing schemes whereby a firing pulse of 5-10 microseconds duration is used to fire the controlled rectifiers. With highly inductive loads, such as is presented to alternating current terminals 11, 12 by the transformer 14, a problem arises with respect to pulse firing controlled rectifiers. If controlled rectifiers are connected in a highly inductive load, they might fire briefly in response to the application of a firing potential pulse to the gates but they might not remain in a firing condition due to the slow buildup of current through the inductive load to maintain conduction. Accordingly, additional circuitry is required to insure that the controlled rectifiers will receive a firing signal of sufficient duration to allow the anode current to build up to the holding current level of the device. The controlled rectifiers are alternately maintained in a firing condition by applying a signal to the respective gate and maintaining this signal upon the gate for the remainder of the half cycle for which the controlled rectifier is to be conducting, in a manner which will be subsequently described.

The controlled rectifier switch includes a connection 52 between a point intermediate the serially connected diodes 44, 46 and a point intermediate the serially connected controlled rectifiers 48, 50 to permit the switch to act as a bridge and to permit the gate circuits of 48, 50 to employ a common return in a manner which will also be subsequently described. The output of transformer 14 is fed from a secondary winding 54 through a pair of rectifiers 56, 58 connected for fullwave rectification. The center tap 59 of winding 54 is connected to an output terminal 60 while the pair of fullwave connected diodes 56, 58 have their cathodes connected through filter 20 to output terminal 61. Filter 20 includes a shunt connected diode 62 and a serially connected inductance 64. The purpose of diode 62 is to provide a path for discharge of the energy stored in the inductance 64 during intervals when controlled rectifiers 48, 50 are not conducting. Such an arrangement may substantially reduce the current through controlled rectifiers 48, 50 when the conduction period is short. Inductance 64 reduces the ripple content in the direct current output of the power supply. The diode 62 is not essential if a bridge rectifier is used in place of rectifiers 56, 58.

To maintain controlled rectifiers 48, 50 with a firing potential on their gates a squarewave deriving circuit is coupled to the alternating current line and applies a squarewave to the respective gates of controlled rectifiers 48, 50. This squarewave deriving circuit includes a series resistor 75 and the clipper circuit 34 which includes two pairs of diodes 77, 78 and 79, 80, each pair connected in polarity opposition and a Zener diode 82 connected between the points intermediate the pairs of serially connected diodes. The diodes 77–80 are also connected to an output winding 84 of a transformer 85. The output of this clipper circuit 34 is a sine wave applied to the primary winding 84 except that the top of each half cycle is clipped off. If the breakdown voltage of Zener diode 82 is small compared to the peak voltage of the alternating current supply at 11, 12, the resultant voltage on winding 84 is substantially a squarewave. Transformer 85 includes a secondary winding 88 having a center tap 89 and a pair of terminals 90, 91.

The output of the winding 88 is fed through the diodes 93, 94 to the gates of controlled rectifiers 48, 50, respectively. The center tap of winding 88 is advantageously a common return for the gate control circuits of controlled rectifiers 48, 50 and is connected through the controlled rectifier firing circuit 32 which includes a controlled rectifier 95 connected to the intermediate connection 52 of the controlled rectifier switch 16. The purpose of employing diodes 93, 94 is to maintain a 50% duty cycle on the gates of controlled rectifiers 48, 50. It is thereby possible to employ a firing signal substantially greater than the minimum required to fire all devices without exceeding the power handling capacity of the gate electrode of the controlled rectifier. The common return from the controlled rectifier to the center tap 89 of winding 88 is fed through controlled rectifier 95 which is a much smaller controlled rectifier than controlled rectifiers 48, 50. For example, controlled rectifier 95 may be rated at one ampere and a relatively low voltage as compared to controlled rectifiers 48, 50 as only about 10 volts peak is applied to the firing circuit. This controlled rectifier 95 is employed to control the firing of controlled rectifiers 48, 50, firing of which is closely synchronized with the alternating current input signal applied to terminals 11, 12. When it is desired to fire controlled rectifiers 48, 50, it is merely necessary to fire the smaller controlled rectifier, namely controlled rectifier 95. Controlled rectifier 95 will block any current being fed from the secondary winding 88 of transformer 85 until controlled rectifier 95 is fired. Controlled rectifier 95 will not fire until a firing pulse is applied to its gate from phase control oscillator 30. Because firing potential is applied alternately to controlled rectifiers 48, 50, one or the other will fire when controlled rectifier 95, in the common gate return circuit, fires. Once controlled rectifier 95 is fired, it continues to fire until the current flowing through it from winding 88 of transformer 85 goes to zero. When this current goes to zero, controlled rectifier 95 turns off again permitting control of controlled rectifier 95 by the phase control oscillator 30. During alternate half cycles the other controlled rectifier of the two controlled rectifiers 48, 50 will fire, depending on which end of the winding 88 is positive with respect to the center tap 89. The control by controlled rectifier 95 applies on alternate half cycles to controlled rectifiers 48, 50. Thus one controlled rectifier, namely controlled rectifier 95, is controlling controlled rectifier switch 16 for both halves of the cycle.

Phase control oscillator 30 is a unijunction transistor type of relaxation oscillator well known in the art. It includes unijunction transistor 100 and capacitor 102, the charging rate of which determines the period of oscillation. The pulse output is obtained on primary winding 104 of pulse transformer 105 and is thus coupled to controlled rectifier 95. Control of output power from the main controlled rectifiers 48, 50 is obtained by timing a suitable length from the beginning of the half cycle and then firing controlled rectifier 95. Accordingly, means must be provided for synchronizing the timing of the phase control oscillator with the alternating current supply. Advantageously, this synchronizing control is obtained through a synchronizing circuit comprising a tertiary winding 116 of transformer 85 having a center tap 117 and a pair of diodes 118, 120 connected for fullwave rectification and having their cathodes connected to a terminal 122 of the phase control oscillator 30. A terminal 124 is connected to the emitter electrode of transistor 110 and to center tap 117 of winding 116. The output signal fed from winding 116 to terminals 122, 124 will be flat-topped direct current pulses which go to zero at the end of every half cycle of the alternating current signal fed to terminals 11, 12. Thus, the oscillator will stop oscillating for a brief period at the end of each half cycle and will begin timing at the start of the next half cycle.

The timing of oscillator 30 is controlled by transistor 110 and capacitor 102. The capacitor 102 charges in a linear fashion through the emitter-collector path of transistor 110 in response to signals from the voltage sensing circuit in a manner to be described later. When the potential across capacitor 102 exceeds the threshold of unijunction transistor 100, then transistor 100 fires and delivers an output pulse across primary winding 104 of transformer 105. These output pulses are delivered from secondary winding 107 to the gate of controlled rectifier 95 to thereby gate the controlled rectifier 95 in synchronism with the applied alternating current voltage at terminals 11, 12. If transistor 110 conducts heavily and rapidly charges capacitor 102, then transistor 100 fires early in the cycle and thus causes controlled rectifier 95 to fire early in the cycle. When controlled rectifier 95 fires, either controlled rectifier 48 or 50 fires, depending on which of the respective gates is pulsed through diodes 93, 94. Once controlled rectifier 48 or 50 conducts, it continues to conduct until the end of the half cycle of the potential applied to terminals 11, 12. Thus, the earlier in the cycle that the controlled rectifiers 48, 50 conduct, the longer will be the pulses on the primary winding of transformer 14 and the greater will be the output power at terminals 60, 61. The duration of these input pulses, of course, determines the amount of output power appearing at the secondary winding 54, shorter duration pulses causing lower output power at the secondary winding 54 and longer duration pulses causing greater output power at the secondary winding 54. On the other hand, if transistor 110 conducts current slowly and capacitor 102 charges slowly, then transistor 100 will fire relatively late in the cycle and will fire the switch controlling controlled rectifier 95 relatively late in the cycle, thereby causing the controlled rectifiers 48, 50 to fire late in the cycle thus giving shorter input pulses on the primary winding of transformer 14 and lower power at output terminals 60, 61.

The phase control oscillator 30 is connected to respond to increases and decreases of output voltage at the output terminals 60, 61 so that rapid regulation of the system takes place. This regulation is achieved by a feedback from output terminals 60, 61 through a voltage sensing circuit 26 which compares the feedback voltage with a reference voltage. The voltage sensing circuit includes a voltage divider defined by resistors 130, 132 and 134 connected in series across terminals 60, 61. Preferably, resistor 132 is variable and the variable tap is connected to a base electrode of a transistor 136, the collector of which is connected to the base electrode of transistor 110.

The emitter electrode of transistor 136 is connected to one terminal of a Zener voltage reference diode 140, the other terminal of which is connected to the remote terminal of resistor 130. The voltage reference circuit includes Zener diode 140 and resistor 142 connected between the one terminal of Zener diode 140 and terminal 60 to provide a constant voltage emitter bias on transistor 136. When the voltage across output terminals 60, 61 increases, the base electrode of transistor 136 becomes more negative and less current flows through transistor 136 to the base electrode of transistor 110. Because transistor 110 receives less base current it conducts less current and capacitor 102 charges slowly so that unijunction transistor 100 fires later in the cycle thereby causing controlled rectifiers 48, 50 to fire later in the cycle and thus reducing the output power at terminals 60, 61. Conversely, a decrease in the potential across the voltage divider 130, 132, 134 produces more rapid charging of capacitor 102 and earlier firing of controlled rectifiers 95, 48 and 50 thus increasing the output power at terminals 60, 61. In one example of this invention, a closely regulated output of 200 amperes at 4 volts was obtained from a 110-volt source.

Figure 3:
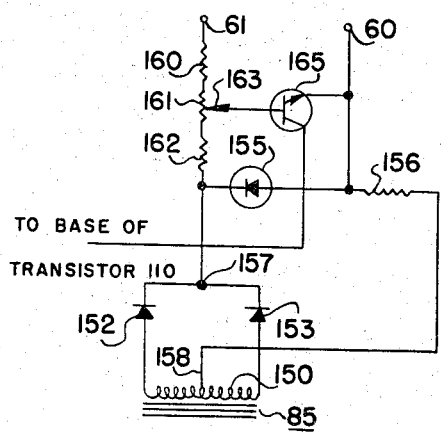
FIGURE 3 is a schematic representation of a voltage sensing and a reference voltage circuit which may be substituted in the embodiment of FIGURE 2.

FIGURE 3 shows schematically an alternative embodiment of voltage sensing circuit 26 and voltage reference circuit 28 which may be substituted in the circuit of FIGURE 2. The embodiment of FIGURE 3 is a preferred embodiment when the output voltage across terminals 60, 61 is less than the reference voltage of voltage reference circuit 28, i.e., is less than the breakdown voltage of Zener diode 140. In FIGURE 3, winding 150 is an additional winding on transformer 85 and has a pair of rectifiers 152, 153 connected to its outer terminals for fullwave rectification. A reference voltage Zener diode 155 and a resistor 156 are serially connected between an output terminal 157 and a center tap 158 of winding 150 to complete the voltage reference circuit 28. The voltage sensing circuit includes a series voltage divider including resistors 160, 161 and 162 serially connected between the output terminal 60 and the terminal 157. The resistor 161 is variable and has its movable tap 163 connected to a base electrode of a transistor 165. The emitter electrode of transistor 165 is connected to a point intermediate Zener diode 155 and resistor 156 and is also connected to output terminal 61. The phase controlling signal is fed to the base electrode of transistor 110 from the collector electrode of transistor 165. From the circuit arrangement of FIGURE 3, it will be apparent that the potential on output terminals 60, 61 is added in series with the Zener voltage of Zener diode 155.

While I have shown and described one illustrative embodiment of this invention, it is understood that the features and concepts thereof may be applied to other embodiments without departing from the spirit and scope of this invention.

What is claimed is:

1. A regulated rectifier circuit comprising alternating current input terminal means including a pair of input terminals, transformer means including a primary and a secondary winding, each having a pair of terminals, controlled rectifier switch means coupling one terminal of said primary winding to one of said input terminals, output means coupled to said transformer means including a pair of output terminals, clipper means connected to said input terminal means for deriving substantially squarewave pulses from an alternating current and means for firing said controlled rectifier switch means including a controlled rectifier, phase control means and voltage sensing means coupling said output terminals to said phase control means, said firing means being coupled to said phase control means and to said controlled rectifier switch means, said clipper means being connected to said firing means controlled rectifier for energizing said switch means with substantially squarewave pulses.

2. A regulated rectifier circuit comprising alternating current input terminal means, transformer means, controlled rectifier switch means including a pair of serially connected controlled rectifiers coupling said transformer means to said input terminal means, output means coupled to said transformer means including a pair of output terminals, squarewave deriving means coupled to said input terminal means for deriving substantially squarewave pulses from an alternating current, gate means coupled between said squarewave deriving means and said switch means controlling the application of said substantially squarewave pulses to said switch means whereby said pulses are available to said switch means throughout each half cycle of the alternating current at said input terminals, and feedback means coupled between said output terminals and said gate means for delivering a signal to said gate means indicative of an electrical variable, said gate means controlling said controlled rectifier switch means to vary the pulse width of pulses supplied to said transformer means through said switch means in accordance with said feedback signal.

3. A regulated rectifier circuit, comprising input means including a pair of input terminals, transformer means having a pair of input terminals, a pair of controlled rectifier switch means each coupling one terminal of said transformer means to one terminal of said input terminal means, output means coupled to said transformer means including a pair of output terminals, squarewave deriving means coupled to said input terminal means, switch control means coupled between said squarewave deriving means and said controlled rectifier switch means for controlling the application of squarewave signals to said controlled rectifier switch means from said squarewave deriving means, feedback means coupled between said output terminals and said switch control means and synchronizing means coupled between said squarewave deriving means and said feedback means for delivering a synchronizing signal to said feedback means.

4. In a regulated rectifier circuit, the combination comprising input terminal means, inductive means, solid state switch means coupling said inductive means to said input terminal means, squarewave deriving means connected to said input terminal means for deriving substantially squarewave pulses from an alternating current, switch control gate means coupled between said deriving means and said switch means for controlling the application of squarewave pulses to said solid state switch means, phase control means having an output coupled to said gate means and voltage sensing means coupling said inductive means to said phase control means, said gate means being coupled to said phase control means.

5. A regulated rectifier circuit, comprising input means, inductive means, solid state switch means coupling said inductive means to said input means, output means coupled to said inductive means, squarewave pulse deriving means coupled to said input means, gate means for activating said solid state switch means, and feedback means coupling said output means to said gate means, said gate means being coupled between said squarewave deriving means and said solid state switch means for controlling the application of squarewave pulses from said deriving means to said switch means.

6. In a regulated rectifier circuit having a pair of output terminals, the combination comprising a pair of alternating current input terminals, transformer means coupled to said output terminals, switch means coupling said transformer means to said input terminals, said switch means comprising a pair of serially connected diodes connected in polarity opposition and a pair of serially connected controlled rectifiers connected in polarity opposition and in opposition to the connection of said pair of diodes, the pairs of diodes being connected in parallel with the pair of rectifiers, means connecting said diodes to said rectifiers intermediate the pairs thereof, a synchronizing circuit coupled to said input terminals, means for selectively firing one of said controlled rectifiers, said firing means including a third controlled rectifier having one terminal connected intermediate said pairs of controlled rectifiers and another terminal coupled to said synchronizing circuit and voltage responsive means coupled between said output terminals and said third controlled rectifier.

7. In a regulated rectifier circuit, the combination comprising input means, transformer means, controlled solid state switch means including a pair of serially connected controlled rectifiers connected in polarity opposition and coupling said transformer means to said input means, output means coupled to said transformer means, squarewave deriving means connected to said input means for deriving substantially squarewave pulses from an alternating current, switch control means including gate means coupled between said squarewave deriving means and said switch means for controlling the transmission of squarewave signals to said controlled solid state switch means, feedback means connected between said output means and said gate means for delivering a feedback signal to said gate means, said squarewave deriving means including at least two pairs of serially connected diodes, each pair connected in polarity opposition, one pair connected oppositely to the other pair, and a reference voltage device connecting said two pairs of diodes at points intermediate said pairs.

8. In a regulated electrical rectifier circuit, the combination comprising input means, transformer means, switch means coupling said transformer means to said input means, output means coupled to said transformer means, squarewave pulse deriving means coupled to said input means, gate means coupled between said squarewave deriving means and said switch means for selectively gating squarewave pulses thereto and feedback means coupled between said output means and said gate means for controlling the operation of said switch control means to thereby control the application of squarewave pulses to said switch means.

9. A regulated electrical rectifier circuit comprising input means, transformer means, switch means coupling said transformer means to said input means, output means coupled to said transformer means, squarewave pulse deriving means coupled to said input means, switch control means coupled to said squarewave deriving means and to said switch means and feedback means coupled between said output means and said switch control means for controlling the operation of said switch control means to thereby control the application of squarewave pulses to said switch means, said feedback means including voltage sensing means having a voltage divider connected across said output means, a Zener diode and a resistor serially connected in parallel with said voltage divider and a transistor including at least three electrodes, one of said electrodes being connected intermediate said voltage divider, another of said electrodes being connected intermediate said Zener diode and said resistor and the third of said electrodes being coupled to said switch control means.

10. A regulated rectifier circuit comprising: a pair of alternating current input terminals; a transformer having a primary winding, one terminal of which is connected to one of said pair of input terminals; controlled rectifier switch means connecting the other terminal of said primary winding to the other of said pair of input terminals; squarewave deriving means coupled to said input terminals for deriving squarewave pulses from alternating current supplied to said input terminals; switch control means connected between said squarewave deriving means and said controlled rectifier switch means for controlling the transmission of squarewave pulses to said switch means; feedback means coupled between said transformer and said switch control means, said feedback means including voltage sensing means and phase control means connected to the output of said voltage sensing means and having its output connected to said switch control means; and, synchronizing means coupled between said squarewave deriving means and said phase control means; said controlled rectifier switch means including a pair of oppositely poled, serially connected, controlled rectifiers and a pair of diodes serially connected and oppositely poled, connected in parallel with said serially connected controlled rectifiers, each of said controlled rectifiers having a control electrode, said switch control means including a center tapped transformer winding having two terminals, a further controlled rectifier having its cathode-anode circuit connected between said center tap and said pair of controlled rectifiers and a pair of diodes, each connected between one terminal of said center tapped transformer winding and one of said control electrodes.

11. In a regulated rectifier circuit, the combination comprising: alternating current input means; load means; controlled rectifier switch means connecting said load means to said input means; squarewave pulse deriving means coupled to said input means; switch control means connected between said controlled rectifier switch means and said squarewave deriving means for controlling the application of squarewave pulses to said switch means and phase control oscillator means coupled to said load means and including a charging capacitor coupled between said switch control means and said squarewave deriving means for controlling said switch control means in accordance with signals delivered from said squarewave deriving means to said charging capacitor.

12. In a regulated rectifier circuit, the combination comprising: a pair of input terminals; a pair of output terminals, a pair of serially connected diodes connected in polarity opposition between said input terminals and said output terminals; a pair of controlled rectifiers connected in polarity opposition and in parallel with said pair of diodes, said diodes being poled oppositely with respect to said rectifiers; intermediate terminal means connecting a point intermediate said diodes with a point intermediate said controlled rectifiers; a common return firing circuit for said controlled rectifiers including a third controlled rectifier having one electrode connected to said intermediate terminal; means for applying a substantially squarewave to the control electrodes of said pair of controlled rectifiers including a pair of diodes, each connected to the control electrode of one of said pair of controlled rectifiers and each coupled to said third controlled rectifier; and, phase control means coupled between said output terminals and said third controlled rectifier.

References Cited

UNITED STATES PATENTS

| | | | |
|---|---|---|---|
| 3,113,260 | 12/1963 | Wiley | 323—4 |
| 3,215,864 | 11/1965 | Doyle | 307—88.5 |
| 3,252,077 | 5/1966 | Schonholzer | 323—22 |
| 3,263,157 | 7/1966 | Klein | 323—22 |
| 3,277,362 | 10/1966 | Elliott | 323—24 |

OTHER REFERENCES

Glasberg: "Silicon Controlled Rectifiers," Electromechanical Design, March 1962.

JOHN F. COUCH, *Primary Examiner.*

WARREN E. RAY, *Examiner.*